United States Patent
Ninomiya (10) Patent No.: US 10,141,880 B2
(45) Date of Patent: Nov. 27, 2018

(54) DRIVING CIRCUIT FOR VOICE COIL MOTOR HAVING A FIRST DRIVER COUPLED TO A FIRST END OF A COIL AND A SECOND DRIVER COUPLED TO A SECOND END OF THE COIL

(71) Applicant: ROHM CO., LTD., Ukyo-Ku, Kyoto (JP)

(72) Inventor: Tatsuya Ninomiya, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 503 days.

(21) Appl. No.: 14/920,266

(22) Filed: Oct. 22, 2015

(65) Prior Publication Data

US 2016/0043680 A1  Feb. 11, 2016

Related U.S. Application Data

(63) Continuation of application No. PCT/JP2014/002340, filed on Apr. 25, 2014.

(30) Foreign Application Priority Data

Apr. 26, 2013 (JP) .................................. 2013-094521

(51) Int. Cl.
*G02B 27/64* (2006.01)
*H02P 25/028* (2016.01)
(Continued)

(52) U.S. Cl.
CPC .............. *H02P 25/028* (2013.01); *G02B 7/04* (2013.01); *G02B 7/08* (2013.01); *G02B 27/646* (2013.01);
(Continued)

(58) Field of Classification Search
CPC ........ G02B 7/04; G02B 27/64; G02B 27/646; H04N 5/23248; H04N 5/23264;
(Continued)

(56) References Cited

U.S. PATENT DOCUMENTS

| | | | |
|---|---|---|---|
| 5,838,515 A | 11/1998 | Mortazavi et al. | |
| 6,023,143 A * | 2/2000 | Salina .................. | G11B 5/5547 318/254.2 |

(Continued)

FOREIGN PATENT DOCUMENTS

| | | |
|---|---|---|
| JP | 09298430 A | 11/1997 |
| JP | 2003052194 A | 2/2003 |

(Continued)

OTHER PUBLICATIONS

Korean Notification of Reason for Refusal corresponding to Application No. 10-2015-7033509; dated Sep. 23, 2016, with English translation.

(Continued)

*Primary Examiner* — Arnel C Lavarias
(74) *Attorney, Agent, or Firm* — Cantor Colburn LLP (57) ABSTRACT

With a driving current as $I_{DRV}$, with a reference voltage as $V_{REF}$, and with a gain as k, a current detection circuit generates a detection voltage $V_S$ represented by $V_S = V_{REF} + k \times I_{DRV}$. An error amplifier amplifies a difference between the detection voltage $V_S$ and a control voltage that indicates a position of the VCM so as to generate an error voltage $V_{ERR}$. A first driver switches the driving current $I_{DRV}$ between a source current and a sink current with respect to one end of the coil according to the error voltage $V_{ERR}$. A second driver switches the driving current $I_{DRV}$ between a sink current and a source current with respect to the other end of the coil according to the error voltage $V_{ERR}$. The driving circuit allows an external circuit to set the level of the reference voltage $V_{REF}$.

20 Claims, 4 Drawing Sheets (51) Int. Cl.
*G02B 7/04* (2006.01)
*G02B 7/08* (2006.01)
*H02P 25/06* (2016.01)
*H04N 5/225* (2006.01)
*H04N 5/232* (2006.01)
*H02P 25/034* (2016.01)

(52) U.S. Cl.
CPC ............ *H02P 25/034* (2016.02); *H02P 25/06* (2013.01); *H04N 5/2254* (2013.01); *H04N 5/23287* (2013.01); *G03B 2205/0069* (2013.01)

(58) Field of Classification Search
CPC ................. H04N 5/2328; H04N 5/23287; H02P 25/032; H02P 25/034; H04R 3/00
USPC ....... 359/554, 557; 250/201.1, 201.2, 201.4; 396/52, 55; 348/208.99, 208.2, 208.12
See application file for complete search history.

(56) References Cited

U.S. PATENT DOCUMENTS

| | | | | |
|---|---|---|---|---|
| 2002/0081106 | A1* | 6/2002 | Galbiati | ................ H02P 25/034 388/800 |
| 2002/0181141 | A1* | 12/2002 | Kuroiwa | .............. G11B 5/5526 360/77.02 |
| 2003/0155896 | A1* | 8/2003 | Ezio | ................ H02M 7/53871 323/280 |
| 2010/0201301 | A1 | 8/2010 | Lyden et al. | |
| 2012/0163784 | A1 | 6/2012 | Saito et al. | |
| 2014/0340789 | A1* | 11/2014 | Miura | ................... H02P 25/028 360/99.08 |
| 2015/0256731 | A1* | 9/2015 | Ninomiya | .............. H04N 5/238 348/208.11 |

FOREIGN PATENT DOCUMENTS

| | | |
|---|---|---|
| JP | 2004012492 A | 1/2004 |
| JP | 2008043171 A | 2/2008 |
| JP | 2008113506 A | 5/2008 |
| JP | 2008152851 A | 7/2008 |
| JP | 2011135732 A | 7/2011 |
| JP | 2012141377 A | 7/2012 |
| WO | 2009150794 A1 | 12/2009 |

OTHER PUBLICATIONS

Notification of Reasons for Refusal corresponding to Application No. JP2013-094521; dated Jan. 24, 2017.
International Search Report corresponding to Application No. PCT/JP2014/002340; dated Jul. 15, 2014, with English translation.
International Preliminary Report on Patentability corresponding to Application No. PCT/JP2014/002340; dated Oct. 27, 2015, with English translation.

* cited by examiner

DRIVING CIRCUIT FOR VOICE COIL MOTOR HAVING A FIRST DRIVER COUPLED TO A FIRST END OF A COIL AND A SECOND DRIVER COUPLED TO A SECOND END OF THE COIL

CROSS-REFERENCE TO RELATED APPLICATIONS

This application is a continuation under 35 U.S.C. § 120 of PCT/JP2014/002340, filed Apr. 25, 2014, which is incorporated herein reference and which claimed priority to Japanese Application No. 2013-094521, filed Apr. 26, 2013. The present application likewise claims priority under 35 U.S.C. § 119 to Japanese Application No. 2013-094521, filed Apr. 26, 2013, the entire content of which is also incorporated herein by reference.

BACKGROUND OF THE INVENTION

Field of the Invention

The present invention relates to a control technique for a voice coil motor.

Description of the Related Art

Digital still cameras, digital video cameras, or electronic devices (e.g., cellular phones) having an image acquisition function include an actuator for positioning a focusing lens. Known examples of such actuators include actuators using a stepping motor method, actuators using a piezoelectric method, and actuators using a voice coil motor (VCM) method.

A VCM is capable of generating driving power in a linear direction that corresponds to the direction of a current that flows through its coil. Known examples of such a VCM driving method include a spring return method and a bi-directional driving method.

With a spring return mechanism VCM, a driving current is supplied to a coil so as to generate a driving force in a first direction. Furthermore, a driving force is generated in a second direction that is the opposite of the first direction by means of a spring coupled with a moving element. That is to say, the spring return mechanism VCM is configured as a combination of an electrical driving mechanism and a dynamic driving mechanism. In a case of employing such a spring return mechanism VCM as a driving source, such an arrangement requires only a driving current that flows through the coil in a single direction, thereby allowing the driving circuit to have a simple configuration.

In contrast, in the bi-directional driving method, such an arrangement employs a driving circuit such as an H-bridge circuit that is capable of switching the driving current between a source current and a sink current on respective ends of the VCM. With the bi-directional driving method, such an arrangement is capable of switching the direction of the coil current, thereby allowing the driving force to be provided in both the positive direction and the negative direction.

With the spring return method, the VCM requires no driving current supply when the position of the VCM is zero (reference position). In contrast, with the bi-directional driving method, the driving current for the VCM can be set to substantially zero even if the reference position is set to a desired value. Thus, such an arrangement has an advantage from the viewpoint of low power consumption.

A driving circuit according to a conventional bi-directional driving method is configured to have left-right symmetry. With the direction of a current that flows through the coil of the VCM in the first direction as a positive direction, the driving circuit is configured to generate a driving current in a range between $-I_{MAX}$ and $I_{MAX}$ with a current value of zero as the center.

However, in some cases, there is a difference in the optimum driving current range between manufacturers of VCMs to be driven, between models of VCMs, or otherwise between sets mounting such VCMs.

SUMMARY OF THE INVENTION

The present invention has been made in order to solve such a problem. Accordingly, it is an exemplary purpose of an embodiment of the present invention to provide a VCM driving circuit which is capable of setting the current range.

An embodiment of the present invention relates to a driving circuit that supplies a bi-directional driving current to a voice coil motor. The driving circuit comprises: a current detection circuit that generates a detection voltage $V_S$ represented by $V_S = V_{REF} + k \times I_{DRV}$, with the driving current as $I_{DRV}$, with a reference voltage as $V_{REF}$, and with a gain as k; an error amplifier that amplifies a difference between the detection voltage $V_S$ and a control voltage that indicates a position of the voice coil motor so as to generate an error voltage; a first driver that is connected to one end of a coil of the voice coil motor, and that switches the driving current between a state in which the driving current flows as a source current and a state in which the driving current flows as a sink current according to the error voltage; and a second driver that is connected to the other end of the coil of the voice coil motor, and that switches the driving current between a state in which the driving current flows as a sink current and a state in which the driving current flows as a source current according to the error voltage. The driving circuit is configured to be capable of setting the level of the reference voltage $V_{REF}$ externally.

With such an embodiment, the relative relation between the control voltage and the driving current $I_{DRV}$ can be shifted according to the reference voltage $V_{REF}$. Thus, such an arrangement is capable of freely setting the range of the driving current.

Also, the current detection circuit may comprise: a detection resistor arranged on a path of the driving current; a first operational amplifier; a first resistor arranged between a first input terminal of the first operational amplifier and a first end of the detection resistor; a second resistor arranged between a second input terminal of the first operational amplifier and a second end of the detection resistor; a third resistor arranged between an output terminal of the first operational amplifier and the first input terminal of the first operational amplifier; and a fourth resistor having one end connected to the second input terminal of the first operational amplifier and another end to which the reference voltage is applied.

Also, the driving circuit according to an embodiment may further comprise: a first D/A converter that converts, into the control voltage configured as an analog signal, digital control data that is received from an external processor and that indicates the position; and a second D/A converter that converts, into the reference voltage configured as an analog signal, correction data that is received from the external processor and that indicates the reference voltage.

Such an arrangement is capable of freely setting, according to the value of the correction data, the range of the driving current to be generated according to the range of the digital control data.

Also, the detection resistor may be arranged between the first end of the coil and an output terminal of the first driver, or otherwise between the second end of the coil and an output terminal of the second driver.

Also, the on resistance of a transistor that forms an output stage of the first driver and the on resistance of a transistor that forms an output stage of the second driver may be used as the detection resistor.

Also, a known DC resistance component of the voice coil motor may be used as the detection resistor.

Also, the error amplifier may comprise: a second operational amplifier having a first input terminal to which the control voltage is input; a first capacitor arranged between a second input terminal and an output terminal of the second operational amplifier; and a fifth resistor having a first end connected to the second input terminal of the second operational amplifier and a second end to which the detection voltage is applied.

Also, the first driver may comprise a non-inverting amplifier that amplifies the error voltage with a predetermined common voltage as a reference voltage so as to apply a first driving voltage to the first end of the coil. Also, the second driver may comprise an inverting amplifier that amplifies the error voltage with the common voltage as a reference voltage so as to apply a second driving voltage to the second end of the coil.

Also, the first driver may comprise: a first voltage-dividing circuit that divides, with a predetermined voltage division ratio, a voltage difference between a first output voltage that develops at the first end of the coil and a predetermined common voltage; and a first amplifier that comprises a first push-pull output stage including a high-side transistor and a low-side transistor, and that controls the high-side transistor and the low-side transistor of the push-pull output stage such that the voltage obtained by voltage division by means of the first voltage-dividing circuit approaches to the error voltage. Also, the second driver may comprise: a second voltage-dividing circuit that divides, with a predetermined voltage division ratio, a voltage difference between a second output voltage that develops at the second end of the coil and the error voltage; and a second amplifier that comprises a second push-pull output stage including a high-side transistor and a low-side transistor, and that controls the high-side transistor and the low-side transistor of the push-pull output stage such that the voltage obtained by voltage division by means of the second voltage-dividing circuit approaches to the common voltage.

Another embodiment of the present invention also relates to a driving circuit that supplies a bi-directional driving current to a voice coil motor. The driving circuit comprises: a current detection circuit that generates a detection voltage $V_S$ that corresponds to the driving current; an error amplifier that amplifies a difference between the detection voltage and a control voltage that indicates a position of the voice coil motor so as to generate an error voltage; a first driver that is connected to one end of a coil of the voice coil motor, and that switches the driving current between a state in which the driving current flows as a source current and a state in which the driving current flows as a sink current according to the error voltage; and a second driver that is connected to the other end of the coil of the voice coil motor, and that switches the driving current between a state in which the driving current flows as a sink current and a state in which the driving current flows as a source current according to the error voltage. The driving circuit is capable of superimposing a shift voltage that is settable by means of an external circuit on at least one of the control voltage and the detection voltage. The error amplifier generates the error voltage such that the control voltage approaches to the detection voltage after the shift voltage is superimposed on at least one of the control voltage and the detection voltage.

With such an embodiment, the relative relation between the control voltage and the driving current $I_{DRV}$ can be shifted according to the shift voltage. Thus, such an arrangement is capable of freely setting the range of the driving current.

Also, the current detection circuit may generate a detection voltage $V_S$ represented by $V_S = V_{REF} + k \times I_{DRV}$, with the driving current as $I_{DRV}$, with a reference voltage as $V_{REF}$, and with a gain as k. Also, the level of the reference voltage $V_{REF}$ may be settable according to correction data received from an external processor. This allows the shift voltage superimposed on the detection voltage to be adjustable according to the correction data.

Also, the control voltage may be obtained by adding a shift voltage that corresponds to correction data received from an external processor to a voltage that corresponds to digital control data that indicates a position of the voice coil motor received from the external processor.

Such an arrangement is capable of controlling a shift voltage superimposed on the detection voltage according to the correction data.

Also, the control voltage may be obtained as a voltage by adding correction data received from an external processor to, or otherwise by subtracting the aforementioned correction data from, digital control data that indicates a position of the voice coil motor received from the external processor, and by converting the digital value thus obtained into an analog voltage.

Such an arrangement is capable of superimposing a shift voltage that corresponds to the correction data on the control voltage.

Also, the driving circuit may further comprise an adder that is arranged as an upstream stage of the error amplifier, and that adds a shift voltage that corresponds to correction data received from an external processor to, or otherwise subtracts the aforementioned correction data from, the detection voltage.

Such an arrangement is capable of superimposing a shift voltage that corresponds to the correction data on the control voltage.

Also, an offset voltage of the error amplifier may be adjustable according to correction data received from an external processor.

Also, the driving circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Yet another embodiment of the present invention relates to a lens module. The lens module comprises: a focusing lens; a voice coil motor having a bi-directional mechanism or otherwise a spring return mechanism arranged such that a moving element thereof is coupled with the focusing lens; and the driving circuit according to any one of the aforementioned embodiments that drive the voice coil motor.

Yet another embodiment of the present invention also relates to a lens module. The lens module comprises: an image stabilization lens; a voice coil motor having a bi-directional mechanism or otherwise a spring return mechanism arranged such that a moving element thereof is coupled with the image stabilization lens; and the driving circuit according to any one of the aforementioned embodiments that drive the voice coil motor.

Yet another embodiment of the present invention relates to an electronic device. The electronic device comprises: any one of the aforementioned lens modules; and an image acquisition element that acquires an image based on light that has passed through the lens module.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B. Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
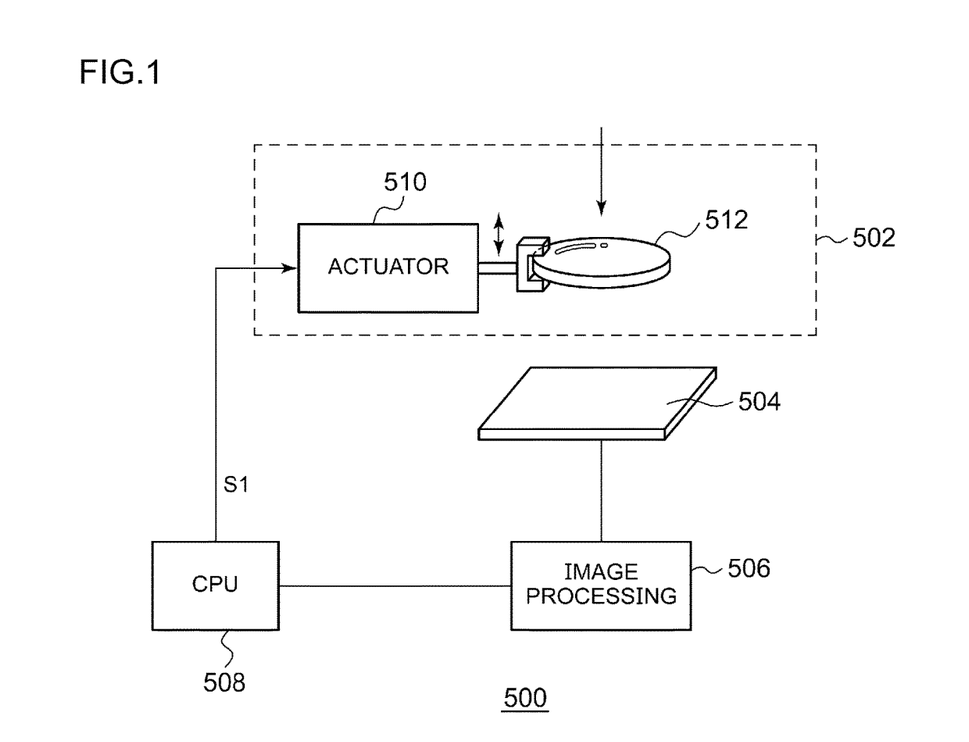
FIG. 1 is a block diagram showing an overall configuration of an electronic device according to an embodiment.

FIG. 1 is a block diagram showing an overall configuration of an electronic device 500 according to an embodiment. The electronic device 500 is configured as a cellular phone having an image acquisition function, a digital still camera, a video camera, a web camera, a tablet PC (Personal Computer), or the like. The electronic device 500 includes a lens module 502, an image acquisition element 504, an image processing processor 506, and a CPU (Central Processing Unit) 508.

The lens module 502 is provided in order to provide a so-called autofocus function. The lens module 502 includes a focusing lens 512 and an actuator 510. The lens 512 is held such that it can be moved in the optical axis direction. The actuator 510 controls the position of the lens 512 according to an instruction value S1 received from the CPU 508.

Light (an image) is input to the image acquisition element 504 after it has passed through the lens 512. The image processing processor 506 reads out the image data from the image acquisition element 504.

The CPU 508 determines the target position to which the focusing lens 512 is to be set, based on the image read out by the image processing processor 506, such that the image that has passed through the focusing lens 512 forms an image on the image acquisition element 504. Furthermore, the CPU 508 outputs an instruction value S1 to the actuator 510 according to the target position thus determined.

The above is the overall configuration of the electronic device 500. Next, description will be made regarding a specific configuration of the lens module 502.

Figure 2:
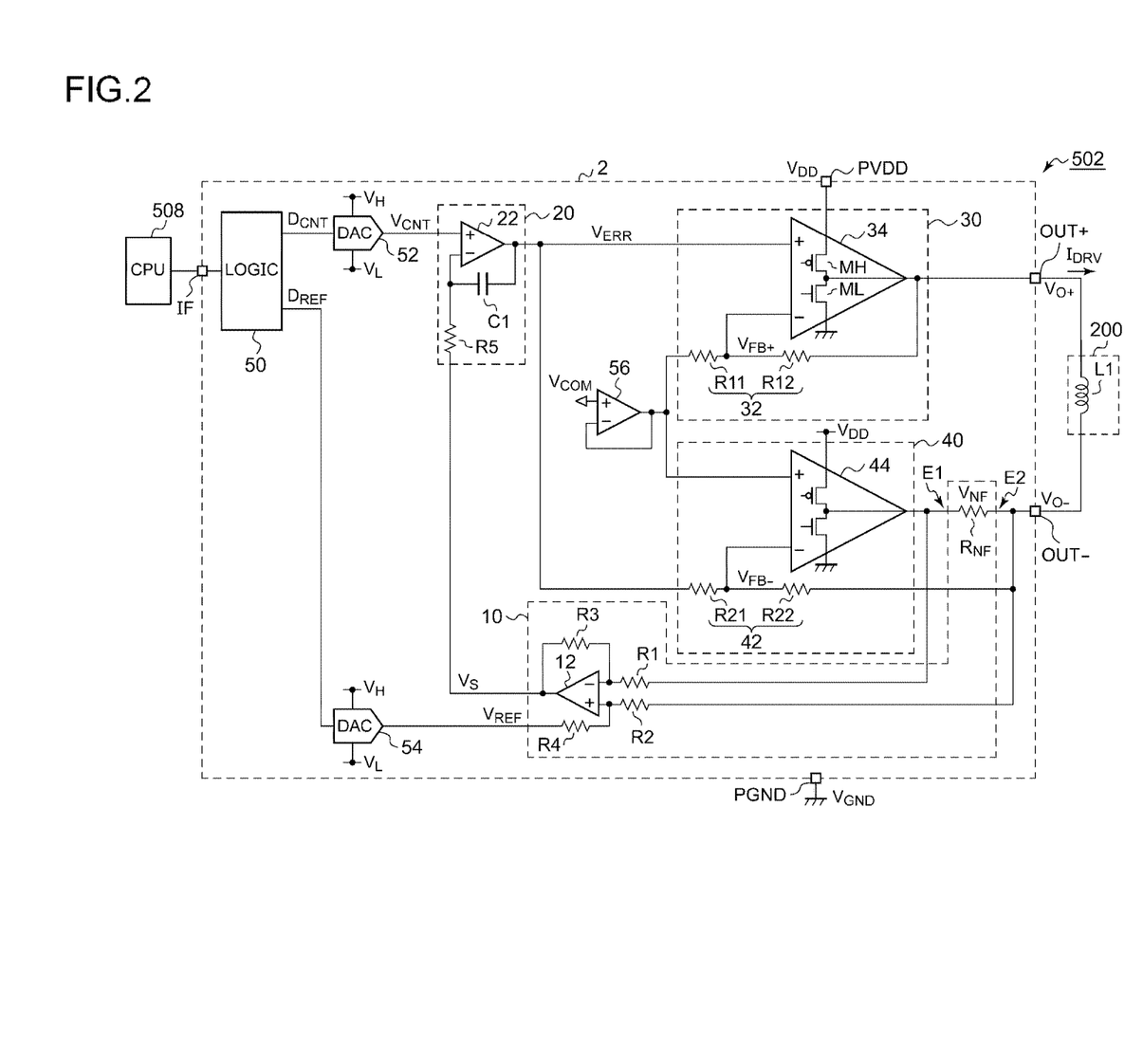
FIG. 2 is a block diagram showing a configuration of a lens module according to the embodiment.

FIG. 2 is a block diagram showing a configuration of the lens module 502 according to the embodiment.

The lens module 502 includes a voice coil motor (VCM) 200 and a driving circuit 2.

The VCM 200 is configured as an actuator that provides positioning of the focusing lens (512 in FIG. 1). The VCM 200 is arranged such that its moving element is coupled with the focusing lens.

The driving circuit 2 includes output terminals OUT+ and OUT−, a power supply terminal PVDD, a ground terminal PGND, and an interface terminal IF.

A power supply voltage $V_{DD}$ is supplied to the power supply terminal PVDD. A ground voltage $V_{GND}$ is supplied to the ground terminal PGND. The interface terminal IF is connected to the external CPU 508 via a bus. The CPU 508 supplies, to the driving circuit 2, control data $D_{CNT}$ which indicates a stroke amount (target position, displacement) for the moving element of the VCM 200.

A coil L1 of the VCM 200 to be driven is connected between the output terminals OUT+ and OUT−. The driving circuit 2 supplies a bi-directional driving current $I_{DRV}$ to the coil L1 of the VCM 200 according to the control data $D_{CNT}$, so as to control the position of the moving element. When the driving current $I_{DRV}$ that flows through the coil L1 is zero, the moving element comes to a stop at the predetermined reference position. When the driving current $I_{DRV}$ flows through the coil L1 in the positive direction, the position of the moving element is changed in the first direction according to the current value. Conversely, when the driving current $I_{DRV}$ flows through the coil L1 in the negative direction, the position of the moving element is changed in the second direction according to the current value. Description will be made in the present embodiment with the direction in which the driving current $I_{DRV}$ flows from the output terminal OUT+ to the output terminal OUT− as the positive direction.

The driving circuit 2 includes a current detection circuit 10, an error amplifier 20, a first driver 30, a second driver 40, a logic unit 50, a first D/A converter 52, a second D/A converter 54, and a buffer 56.

The logic unit 50 includes an interface circuit that transmits and receives data or instructions between it and the CPU 508, and a register or the like that stores the data received from the CPU 508.

The current detection circuit 10 detects the driving current $I_{DRV}$ that flows through the coil L1, and generates a detection voltage $V_S$ that corresponds to the driving current $I_{DRV}$. The detection voltage $V_S$ is represented by the following Expression (2) using a gain k and a reference voltage $V_{REF}$.

$$V_S = V_{REF} + k \times I_{DRV} \quad (2)$$

For example, the current detection circuit 10 includes a detection resistor $R_{NF}$, a first resistor R1, a second resistor R2, a third resistor R3, and a fourth resistor R4.

The detection resistor $R_{NF}$ is arranged on a path of the driving current $I_{DRV}$. For example, the detection resistor $R_{NF}$ is arranged between the second end of the coil L1 and the output terminal of the second driver 40. Alternatively, the detection resistor $R_{NF}$ may be arranged between the first end of the coil L1 and the output terminal of the first driver 30. A voltage drop $V_{NF}$ occurs at the detection resistor $R_{FN}$ in proportion to the driving current $I_{DRV}$.

The first resistor R1 is arranged between the first input terminal (inverting input terminal) of a first operational amplifier 12 and a first end E1 of the detection resistor $R_{NF}$. The second resistor R2 is arranged between the second input terminal (non-inverting input terminal) of the first operational amplifier 12 and a second end E2 of the detection resistor $R_{NF}$. The third resistor R3 is arranged between the output terminal and the first input terminal (inverting input terminal) of the first operational amplifier 12. The fourth resistor R4 is arranged such that its one end is connected to the second input terminal (non-inverting input terminal) of the first operational amplifier 12 and such that the reference voltage $V_{REF}$ is applied to its other end.

In the following description, V1 represents an electric potential at the first end E1 of the detection resistor $R_{NF}$, and V2 represents an electric potential at the second end E2 of the detection resistor $R_{NF}$. When the relation (R1=R2=Ra) and the relation (R3=R4=Rb) hold true, the detection voltage $V_S$ is represented by the following Expression (3).

$$V_S = V_{REF} + Rb/Ra \times (V2 - V1) \quad (3)$$

By substituting Expression (3) into Expression (4), Expression (5) is obtained.

$$V_{NF} = V2 - V1 = R_{NF} \times I_{DRV} \quad (4)$$

$$V_S = V_{REF} + Rb/Ra \times R_{NF} \times I_{DRV} \quad (5)$$

Thus, the gain k of the current detection circuit 10 is represented by ($Rb/Ra \times R_{NF}$).

It should be noted that the configuration of the current detection circuit 10 is not restricted to such a configuration shown in FIG. 2. Also, the current detection circuit 10 may have other configurations.

The first D/A converter 52 converts the control data $D_{CNT}$, which is received by the logic unit 50 from the CPU 508, into an analog control voltage $V_{CNT}$. The control voltage $V_{CNT}$ indicates a target stroke amount to be applied to the moving element of the VCM 200.

The driving circuit 2 according to the present embodiment is configured to allow an external circuit to set the level of the reference voltage $V_{REF}$. Specifically, the logic unit 50 is configured to receive, from the CPU 508, correction data $D_{REF}$ that indicates the reference voltage $V_{REF}$. The second D/A converter 54 converts the correction data $D_{REF}$ received by the logic unit 50 into the analog reference voltage $V_{REF}$.

The error amplifier 20 amplifies a difference between the control voltage $V_{CNT}$ that indicates the position value for the voice coil motor and the detection voltage $V_S$ so as to generate an error voltage $V_{ERR}$. For example, the error amplifier 20 may be configured as an integrator. For example, the error amplifier 20 includes a second operational amplifier 22, a first capacitor C1, and a fifth resistor R5.

The control voltage $V_{CNT}$ is input to the first input terminal (non-inverting input terminal) of the second operational amplifier 22. The first capacitor C1 is arranged between the second input terminal (inverting input terminal) and the output terminal of the second operational amplifier 22. The fifth resistor R5 is arranged such that its first end is connected to the second input terminal (inverting input terminal) of the second operational amplifier 22, and such that the detection voltage $V_S$ is applied to its second end.

It should be noted that the configuration of the error amplifier 20 is not restricted to such an arrangement shown in FIG. 2.

The first driver 30 is connected to one end of the coil L1 of the voice coil motor 200. The first driver 30 switches the driving current $I_{DRV}$ according to the error voltage $V_{ERR}$, between a state in which the driving current $I_{DRV}$ flows as a source current and a state in which the driving current $I_{DRV}$ flows as a sink current.

The second driver 40 operates with the reverse phase of the first driver 30. The second driver 40 is connected to the other end of the coil L1 of the voice coil motor 200. Furthermore, the second driver 40 switches the driving current $I_{DRV}$ according to the error voltage $V_{ERR}$, between a state in which the driving current $I_{DRV}$ flows as a sink current and a state in which the driving current $I_{DRV}$ flows as a source current.

The buffer 56 outputs a predetermined common voltage $V_{COM}$. The first driver 30 includes a non-inverting amplifier that performs amplification without inversion of the error voltage $V_{ERR}$ with the common voltage $V_{COM}$ as a reference voltage, and that applies a first driving voltage $V_{O+}$ to the first end of the coil L1. In contrast, the second driver 40 includes an inverting amplifier that performs amplification with inversion of the error voltage $V_{ERR}$ with the common voltage $V_{COM}$ as a reference voltage, and that applies, to the second end of the coil L1, a second driving voltage $V_{O-}$ having the reverse phase of the first driving voltage $V_{O+}$.

More specifically, the first driver 30 includes a first voltage-dividing circuit 32 and a first amplifier 34. The first voltage-dividing circuit 32 includes resistors R11 and R12, and divides the voltage difference between the first output voltage $V_{O+}$ at the first end of the coil L1 and the predetermined common voltage $V_{COM}$ using a predetermined voltage division ratio. The first amplifier 34 includes a push-pull output stage comprising a high-side transistor MH and a low-side transistor ML. The first amplifier 34 controls the high-side transistor MH and the low-side transistor ML included in its push-pull output stage such that a voltage $V_{FB+}$ obtained by the first voltage-dividing circuit 32 approaches to the error voltage $V_{ERR}$.

The second driver 40 includes a second voltage-dividing circuit 42 and a second amplifier 44. The second amplifier 44 includes resistors R21 and R22, and divides the voltage difference between the second output voltage $V_{O-}$ at the second end of the coil L1 and the error voltage $V_{ERR}$ using a predetermined voltage division ratio. The second amplifier 44 includes a push-pull output stage comprising a high-side transistor MH and a low-side transistor ML. The second amplifier 44 controls the high-side transistor MH and the low-side transistor ML included in its push-pull output stage such that a voltage $V_{FB-}$ obtained by the second voltage-dividing circuit 42 approaches to the common voltage $V_{COM}$.

Figure 3A:
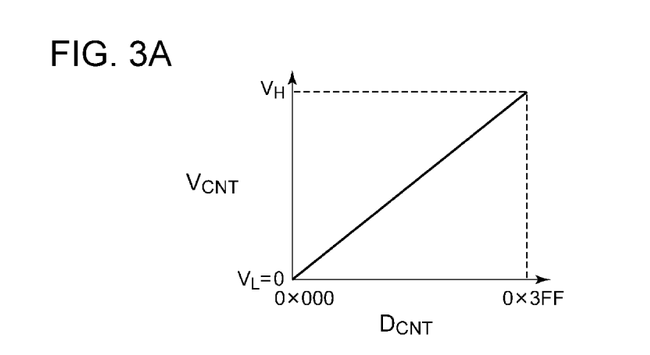
FIGS. 3A through 3C are diagrams each showing the input/output characteristics of a driving circuit shown in FIG. 2.
Figure 3B:
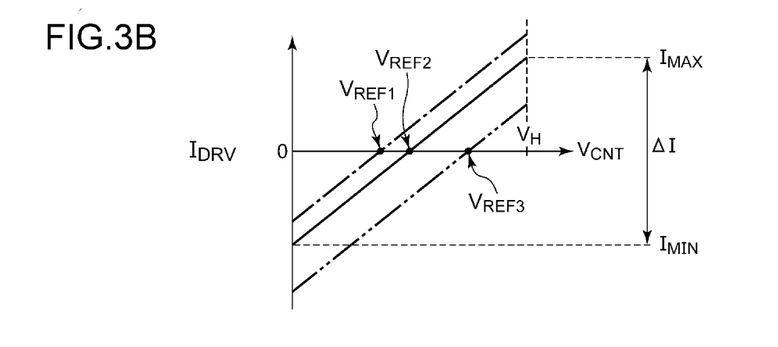
Figure 3C:
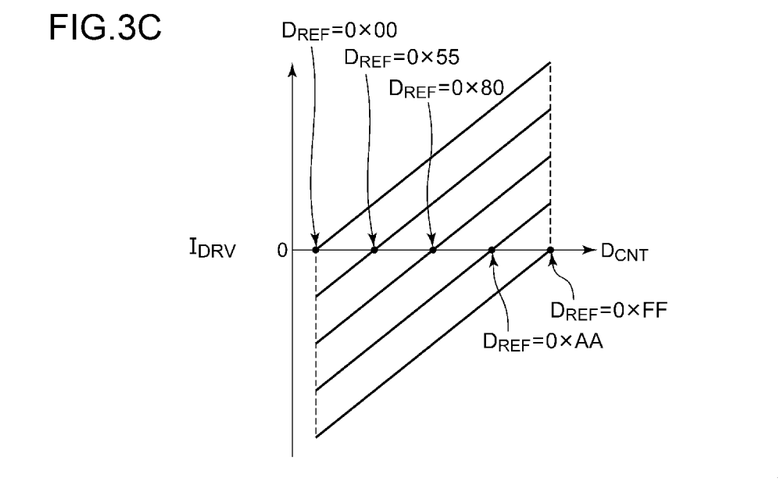

The above is the configuration of the driving circuit 2. Next, description will be made regarding the operation thereof. FIGS. 3A through 3C are diagrams each showing the input/output characteristics of the driving circuit 2 shown in FIG. 2.

Description will be made assuming that the control data $D_{CNT}$ output from the CPU 508 is configured as 10-bit data having a value ranging between 0x000(0) and 0x3FF (1023). As shown in FIG. 3A, when the code for the control data $D_{CNT}$ is 0x000 (0 in decimal notation), the control voltage $V_{CNT}$ is set to a lower reference voltage $V_L$ (e.g., 0 V) provided by the first D/A converter 52. When the code for the control data $D_{CNT}$ is 0x3FF (1023 in decimal notation), the control voltage $V_{CNT}$ is set to an upper reference voltage $V_H$ provided by the first D/A converter 52. In a case in which $V_L$=0 V, the control voltage $V_{CNT}$ is represented by the following Expression with the control data $D_{CNT}$ in decimal notation as as X.

$$V_{CNT}=V_H \times (X/1023)$$

The driving circuit 2 generates the driving voltages $V_{O+}$ and $V_{O-}$ by means of a feedback loop including the error amplifier 20 such that the detection voltage $V_S$ matches the control voltage $V_{CNT}$.

As described above, the detection voltage $V_S$ is represented by Expression (3). Thus, the driving current $I_{DRV}$ is feedback controlled so as to approach a target value represented by the following Expression.

$$I_{DRV}=(V_{CNT}-V_{REF})/k.$$

The control voltage $V_{CNT}$ is supplied in a voltage range between 0 and $V_H$. Thus, the maximum value $I_{MAX}$ of the driving current $I_{DRV}$ is represented by $I_{DRV}=(V_H-V_{REF})/k$, and the minimum value $I_{MIN}$ is represented by $I_{DRV}=-V_{REF}/k$. The width of the range of the driving current $I_{DRV}$, which is represented by $\Delta I=I_{MAX}-I_{MIN}$, is also represented by $V_H/k$, which is a constant value regardless of the reference voltage $V_{REF}$.

That is to say, with the driving circuit 2 shown in FIG. 2, the range of the driving current $I_{DRV}$ can be freely set according to the level of the reference voltage $V_{REF}$. For example, when the reference voltage $V_{REF}$ is set to the center value $V_H/2$ of the voltage range of the control voltage $V_{CNT}$ ranging between 0 and $V_H$, the relation $I_{MAX}=-I_{MIN}$ holds true. In this case, the maximum value of the current that can flow in the positive direction and the maximum value of the current that can flow in the negative direction are the same. In contrast, when the reference voltage $V_{REF}$ is set to a value that is higher than the center value $V_H/2$, the current value that can flow in the negative direction is greater than the current that can flow in the positive direction. Conversely, when the reference voltage $V_{REF}$ is set to a value that is lower than the center value $V_H/2$, the current value that can flow in the positive direction is greater than the current that can flow in the negative direction.

The driving circuit 2 is configured to be capable of setting the reference voltage $V_{REF}$ to be supplied to the current detection circuit 10, according to the reference data $D_{REF}$ received from the CPU 508 configured as an external component. The reference voltage $V_{REF}$ is required to have only a low resolution as compared with the control voltage $V_{CNT}$. Accordingly, the number of bits of the second D/A converter 54 may be on the order of 8 bits. In this case, the reference data $D_{REF}$ is configured as 8-bit data.

With the reference data $D_{REF}$ in decimal notation as Y, the reference voltage $V_{REF}$ is represented by the following Expression.

$$V_{REF}=V_H \times Y/255 \approx V_H \times (4 \times Y)/1023$$

That is to say, when the control data $D_{CNT}$ is equal to a value obtained by multiplying the reference data $D_{REF}$ by 4 (obtained by bit shifting the reference data $D_{REF}$ by 2 bits toward the upper bit side), the driving current $I_{DRV}$ becomes zero.

FIG. 3B shows the relation between the control voltage $V_{CNT}$ and the driving current $I_{DRV}$ with the reference voltage $V_{REF}$ as a parameter. FIG. 3C shows the relation between the control data $D_{CNT}$ and the driving current $I_{DRV}$ with the reference data $D_{REF}$ that indicates the reference voltage $V_{REF}$ as a parameter.

The maximum value $I_{MAX}$ and the minimum value $I_{MIN}$ of the driving current $I_{DRV}$ are represented by the following Expressions.

$$I_{MAX}=\Delta I/1023 \times (1023-(Y \times 4))$$

$$I_{MIN}=\Delta I/1023 \times (-Y \times 4)$$

The above is the operation of the driving circuit 2.

With the driving circuit 2, such an arrangement is capable of setting the ratio between the negative driving current $I_{MIN}$ and the positive driving current $I_{MAX}$ to a desired value. This allows a common driving 2 circuit to drive various kinds of VCMs 200. Also, such an arrangement allows various kinds of platforms to employ such a common driving circuit 2 to drive the VCM 200.

The driving circuit 2 is capable of setting the minimum driving current $I_{MIN}$ to 0 mA, or otherwise of setting the maximum driving current $I_{MAX}$ to 0 mA. That is to say, such an arrangement is capable of generating the driving current $I_{DRV}$ in only one direction. Thus, the driving circuit 2 can be employed as a driving circuit for the spring return method. That is to say, by employing such a common driving circuit 2, such an arrangement allows the user to operate a given platform regardless of whether the platform employs a bi-directional driving method or a spring return method. Such an arrangement provides reduced design time.

Figure 4:
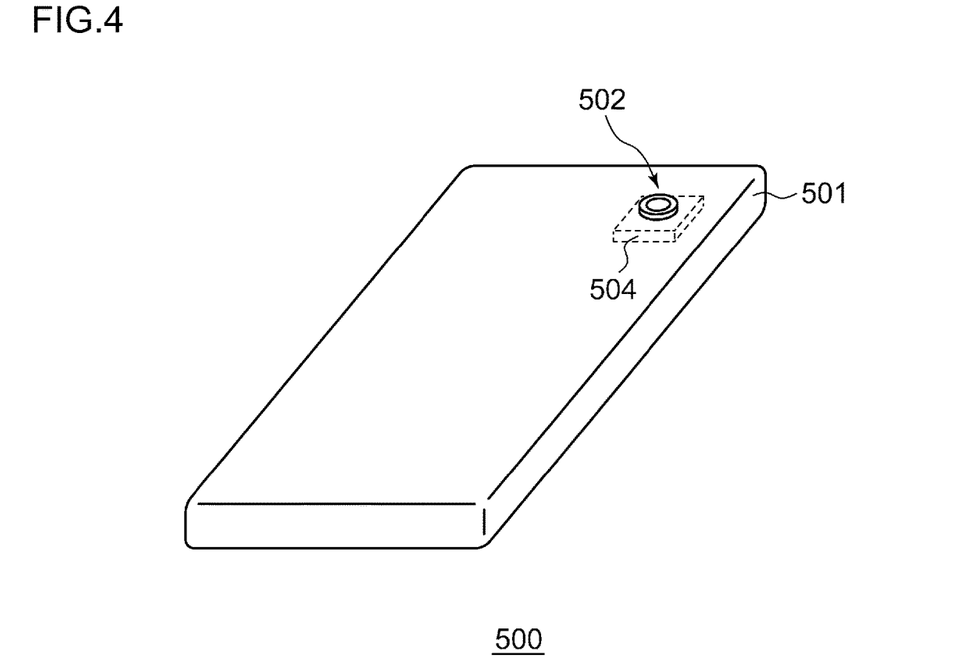
FIG. 4 is a perspective view showing a cellular phone terminal which is an example of an electronic device.

Next, description will be made regarding a specific example of an electronic device 500. FIG. 4 is a perspective view showing a cellular phone terminal which is an example of the electronic device 500. The electronic device 500 includes a housing 501, a lens module 502, and an image acquisition element 504. The image acquisition element 504 is built into the housing 501. The housing 501 is provided with an opening at a position at which it overlaps the image acquisition element 504. The lens module 502 is provided to the opening.

With the aforementioned driving circuit 2, changing the reference voltage $V_{REF}$ is equivalent to superimposing, on the detection voltage $V_S$, a shift voltage that can be set by means of an external circuit. Furthermore, the same effect can be provided by superimposing, on the control voltage $V_{CNT}$ instead of the detection voltage $V_S$, a shift voltage that can be set by means of an external circuit. By extending this idea, the following technical idea can be derived.

That is to say, the driving circuit 2 may be configured to be capable of superimposing a shift voltage, which can be set by means of an external circuit, on at least one from among the control voltage $V_{CNT}$ and the detection voltage $V_S$. Furthermore, the error amplifier 20 may preferably generate the error voltage $V_{ERR}$ such that the control voltage $V_{CNT}$ is equal to the detection voltage $V_S$ after a shift voltage is superimposed on at least one from among the control voltage $V_{CNT}$ and the detection voltage $V_S$.

Thus, by adjusting the value of the shift voltage, such an arrangement is capable of freely setting the range in which the driving current $I_{DRV}$ can be set according to the control voltage $V_{CNT}$. This technical idea includes the following specific embodiments.

1. A shift voltage that can be set according to correction data received from an external circuit is superimposed on (is added to or otherwise subtracted from) the detection voltage $V_S$. This embodiment includes the following techniques.

1.1 The reference voltage $V_{REF}$ is configured as a variable voltage. This technique has been described in the embodiment.

1.2 An analog adder/subtractor unit is provided as an upstream stage of the error amplifier 20, so as to add the shift voltage that corresponds to the correction data $D_{REF}$ to, or otherwise to subtract the shift voltage from, the detection voltage $V_S$. Furthermore, the output voltage of the analog adder/subtractor unit is output to the error amplifier 20.

2. A shift voltage that can be set according to correction data received from an external circuit is superimposed on (is added to or otherwise subtracted from) the control voltage $V_{CNT}$. This embodiment includes the following techniques.

2.1 An analog adder/subtractor unit is arranged between the error amplifier 20 and the first D/A converter 52 so as to add a shift voltage that corresponds to the correction data $D_{REF}$ to, or otherwise to subtract the shift voltage from, the control voltage $V_{CNT}$. Furthermore, the output voltage of the analog adder/subtractor unit is output to the error amplifier 20.

2.2 Digital calculation is performed on the control data $D_{CNT}$ and the correction data $D_{REF}$, each configured as digital data, so as to generate a digital value. The digital value thus obtained is D/A converted by means of the first D/A converter 52 into an analog value. The analog value thus converted is supplied to the error amplifier 20.

3. The input offset voltage of the error amplifier 20 (second operational amplifier 22) is configured as a variable voltage. Furthermore, the offset voltage of the error amplifier 20 is adjusted according to the correction data received from an external processor.

Description has been made regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

Description has been made in the embodiment regarding an arrangement in which the first driver 30 and the second driver 40 provide linear driving of the VCM 200. However, the VCM 200 may be PWM driven. That is to say, the first driver 30 and the second driver 40 may generate pulse driving voltages $V_{O+}$ and $V_{O-}$, respectively. Furthermore, the first driver 30 and the second driver 40 may adjust the duty ratios of the driving voltages $V_{O+}$ and $V_{O-}$, respectively, according to the error voltage $V_{ERR}$.

Modification 2

Description has been made in the embodiment regarding an arrangement in which the detection resistor $R_{NF}$ is arranged between the second driver 40 (first driver 30) and the coil L1. However, the position of the detection resistor $R_{NF}$ is not restricted to such a position. The detection resistor $R_{NF}$ may be arranged in series with the high-side transistor MH between the output terminal OUT+(OUT−) and the power supply line. Also, the detection resistor $R_{NF}$ may be arranged in series with the low-side transistor ML between the output terminal OUT+ (OUT−) and the ground line. Also, the on resistances of the transistors (MH, ML) that form an output stage of the first driver 30 and/or the on resistances of the transistors (MH, ML) that form an output stage of the second driver 40 may be used as the detection resistor $R_{NF}$.

Also, in a case in which the DC resistance component (parasitic resistance) of the VCM 200 is a known value, the DC resistance component may be used as the detection resistor $R_{NF}$. The voltage across both ends of the VCM 200 is represented by the sum of the voltage drop that occurs at the resistance component and the back electromotive force that occurs across the inductance L1. Thus, the current detection circuit 10 may eliminate the back electromotive force that occurs at the coil L1 from the voltage across both ends of the VCM 200, so as to detect the voltage drop that occurs at the resistance component. Such a current detection circuit may be configured using known techniques.

Modification 3

Description has been made in the embodiment regarding an arrangement in which the CPU 508 supplies the digital control data $D_{CNT}$ and the digital reference data $D_{REF}$. However, the present invention is not restricted to such an arrangement. For example, at least one pin is provided to the driving circuit 2 in order to allow the reference voltage $V_{REF}$ to be set. Specifically, the reference voltage $V_{REF}$ may be set according to a combination of pins (which indicates high-level voltage, low-level voltage, or otherwise high impedance). Also, the driving circuit 2 may receive, from an external circuit, the reference voltage $V_{REF}$ configured as an analog signal.

Modification 4

Description has been made in the embodiment regarding a lens module for focusing. However, the usage of the driving circuit 2 is not restricted to such an application. For example, the VCM 200 may drive a lens employed for image stabilization.

While the preferred embodiments of the present invention have been described using specific terms, such description is for illustrative purposes only, and it is to be understood that changes and variations may be made without departing from the spirit or scope of the appended claims.

What is claimed is:

1. A driving circuit that supplies a bi-directional driving current to a voice coil motor, the driving circuit comprising:
    a current detection circuit structured to generate a detection voltage $V_S$ represented by $V_S=V_{REF}+k \times I_{DRV}$, with the driving current as $I_{DRV}$, with a reference voltage as $V_{REF}$, and with a gain as k;
    an error amplifier structured to amplify a difference between the detection voltage $V_S$ and a control voltage that indicates a position of the voice coil motor so as to generate an error voltage;
    a first driver having its output to be coupled to a first end of a coil of the voice coil motor, and structured to switch the driving current between a state in which the driving current flows as a source current and a state in which the driving current flows as a sink current according to the error voltage; and a second driver having its output to be coupled to a second end of the coil of the voice coil motor, and structured to switch the driving current between a state in which the driving current flows as a sink current and a state in which the driving current flows as a source current according to the error voltage, wherein a level of the reference voltage $V_{REF}$ is settable externally.

2. The driving circuit according to claim 1, wherein the current detection circuit comprises:

a detection resistor arranged on a path of the driving current;

a first operational amplifier;

a first resistor arranged between a first input terminal of the first operational amplifier and a first end of the detection resistor;

a second resistor arranged between a second input terminal of the first operational amplifier and a second end of the detection resistor;

a third resistor arranged between an output terminal of the first operational amplifier and the first input terminal of the first operational amplifier; and a fourth resistor having one end connected to the second input terminal of the first operational amplifier and another end to which the reference voltage is applied.

3. The driving circuit according to claim 1, further comprising:

a first D/A converter structured to convert, into the control voltage configured as an analog signal, digital control data that is received from an external processor and that indicates the position; and a second D/A converter structured to convert, into the reference voltage configured as an analog signal, correction data that is received from the external processor and that indicates the reference voltage.

4. The driving circuit according to claim 2, wherein the detection resistor is arranged between the first end of the coil and an output terminal of the first driver, or otherwise between the second end of the coil and an output terminal of the second driver.

5. The driving circuit according to claim 2, wherein an on resistance of a transistor that forms an output stage of the first driver and an on resistance of a transistor that forms an output stage of the second driver are used as the detection resistor.

6. The driving circuit according to claim 2, wherein a known DC resistance component of the voice coil motor is used as the detection resistor.

7. The driving circuit according to claim 1, wherein the error amplifier comprises:

a second operational amplifier having a first input terminal to which the control voltage is input;

a first capacitor arranged between a second input terminal and an output terminal of the second operational amplifier; and a fifth resistor having a first end connected to the second input terminal of the second operational amplifier and a second end to which the detection voltage $V_S$ is applied.

8. The driving circuit according to claim 1, wherein the first driver comprises a non-inverting amplifier that amplifies the error voltage with a predetermined common voltage as a reference voltage so as to apply a first driving voltage to the one end of the coil, and wherein the second driver comprises an inverting amplifier structured to amplify the error voltage with the common voltage as a reference voltage so as to apply a second driving voltage to the other end of the coil.

9. The driving circuit according to claim 1, wherein the first driver comprises:

a first voltage-dividing circuit structured to divide, with a predetermined voltage division ratio, a voltage difference between a first output voltage that develops at the one end of the coil and a predetermined common voltage; and a first amplifier that comprises a first push-pull output stage including a high-side transistor and a low-side transistor, and structured to control the high-side transistor and the low-side transistor of the push-pull output stage such that the voltage obtained by voltage division by means of the first voltage-dividing circuit approaches to the error voltage, and wherein the second driver comprises:

a second voltage-dividing circuit structured to divide, with a predetermined voltage division ratio, a voltage difference between a second output voltage that develops at the other end of the coil and the error voltage; and a second amplifier that comprises a second push-pull output stage including a high-side transistor and a low-side transistor, and structured to control the high-side transistor and the low-side transistor of the push-pull output stage such that the voltage obtained by voltage division by means of the second voltage-dividing circuit approaches to the common voltage.

10. A driving circuit that supplies a bi-directional driving current to a voice coil motor, the driving circuit comprising:

a current detection circuit structured to generate a detection voltage $V_S$ that corresponds to the driving current;

an error amplifier structured to amplify a difference between the detection voltage $V_S$ and a control voltage that indicates a position of the voice coil motor so as to generate an error voltage;

a first driver having its output to be coupled to a first end of a coil of the voice coil motor, and structured to switch the driving current between a state in which the driving current flows as a source current and a state in which the driving current flows as a sink current according to the error voltage; and a second driver having its output to be coupled to a second end of the coil of the voice coil motor, and structured to switch the driving current between a state in which the driving current flows as a sink current and a state in which the driving current flows as a source current according to the error voltage, wherein the driving circuit is capable of superimposing a shift voltage that is settable by means of an external circuit on at least one of the control voltage and the detection voltage $V_S$, and wherein the error amplifier generates the error voltage such that the control voltage approaches to the detection voltage after the shift voltage is superimposed on at least one of the control voltage and the detection voltage.

11. The driving circuit according to claim 10, wherein the current detection circuit generates a detection voltage $V_S$ represented by $V_S = V_{REF} + k \times I_{DRV}$, with the driving current as $I_{DRV}$, with a reference voltage as $V_{REF}$, and with a gain as k, and wherein the level of the reference voltage $V_{REF}$ is settable according to correction data received from an external processor.

12. The driving circuit according to claim 10, wherein the control voltage is obtained by adding a shift voltage that corresponds to correction data received from an external processor to a voltage that corresponds to digital control data that indicates a position of the voice coil motor received from the external processor.

13. The driving circuit according to claim 10, wherein the control voltage is obtained as a voltage by adding correction data received from an external processor to, or otherwise by subtracting the aforementioned correction data from, digital control data that indicates a position of the voice coil motor received from the external processor, and by converting the digital value thus obtained into an analog voltage.

14. The driving circuit according to claim 10, further comprising an adder arranged as an upstream stage of the error amplifier, and structured to add a shift voltage that corresponds to correction data received from an external processor to, or otherwise subtracts the aforementioned correction data from, the detection voltage.

15. The driving circuit according to claim 10, wherein an offset voltage of the error amplifier is adjustable according to correction data received from an external processor.

16. The driving circuit according to claim 1, monolithically integrated on a single semiconductor substrate.

17. A lens module comprising:
a focusing lens;
a voice coil motor arranged such that a moving element thereof is coupled with the focusing lens; and
the driving circuit according to claim 1, structured to drive the voice coil motor.

18. A lens module comprising:
an image stabilization lens;
a voice coil motor arranged such that a moving element thereof is coupled with the image stabilization lens; and
the driving circuit according to claim 1, structured to drive the voice coil motor.

19. An electronic device comprising:
the lens module according to claim 17; and
an image acquisition element structured to acquire an image based on light that has passed through the lens module.

20. An electronic device comprising:
the lens module according to claim 18; and
an image acquisition element structured to acquire an image based on light that has passed through the lens module.

* * * * *